(12) United States Patent
Helot et al.

(10) Patent No.: US 12,360,564 B2
(45) Date of Patent: Jul. 15, 2025

(54) DISPLAY DEVICE FOR A MOTOR VEHICLE, METHOD FOR DISPLAYING DISPLAY CONTENT ON AN EXTENDABLE SCREEN AND MOTOR VEHICLE HAVING A DISPLAY DEVICE

(71) Applicant: AUDI AG, Ingolstadt (DE)

(72) Inventors: Jacques Helot, Ingolstadt (DE); Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/682,653

(22) PCT Filed: Aug. 4, 2022

(86) PCT No.: PCT/EP2022/072020
§ 371 (c)(1),
(2) Date: Feb. 9, 2024

(87) PCT Pub. No.: WO2023/016931
PCT Pub. Date: Feb. 16, 2023

(65) Prior Publication Data
US 2024/0365487 A1    Oct. 31, 2024

(30) Foreign Application Priority Data
Aug. 11, 2021   (DE) .................. 10 2021 120 849.1

(51) Int. Cl.
*H05K 5/02*      (2006.01)
*B60K 35/10*     (2024.01)
(Continued)

(52) U.S. Cl.
CPC .......... *G06F 1/1647* (2013.01); *G06F 1/1624* (2013.01); *G06F 3/1446* (2013.01);
(Continued)

(58) Field of Classification Search
CPC ....... G06F 1/1616–1618; G06F 1/1624; G06F 1/1626; G06F 1/1652; B60K 35/22–235;
(Continued)

(56) References Cited

U.S. PATENT DOCUMENTS 8,174,628 B2 * 5/2012 Matsushita ........... G06F 1/1647
                                                    348/836
8,908,039 B2 * 12/2014 De Wind ............... B60K 35/22
                                                    348/148
(Continued)

FOREIGN PATENT DOCUMENTS

DE   10 2009 036 371 A1   4/2011
DE   10 2012 021 111 A1   4/2014
(Continued)

OTHER PUBLICATIONS

English Translation of IPRP (PCT/IB/338 and PCT/IB/373) (Feb. 22, 2024 and Feb. 13, 2024) and the Written Opinion of ISA (PCT/ISA/237) issued in counterpart International Application No. PCT/EP2022/072020 on Dec. 8, 2022 (14 pages).
(Continued)

*Primary Examiner* — Patrick F Marinelli
(74) *Attorney, Agent, or Firm* — STAAS & HALSEY LLP

(57) ABSTRACT

The examples may relate to a method for displaying display content on an extendable screen and to a display device for a motor vehicle. The display device may include at least a first and a second screen, configured to present respective display contents. The extendable screen may be arranged in a housing of the display device and configured to able to be shifted by an adjustment device between an extended position, in which the extendable screen is extended out of the housing, and a retracted position, in which the extendable screen is recessed in the housing. The display device may include a control unit configured to activate the adjustment (Continued)

device to shift the extendable screen into the extended position, and to display the display content on the extendable screen, when a user action for moving display content from the second screen onto the first screen is detected.

17 Claims, 1 Drawing Sheet

(51) Int. Cl.
| | |
|---|---|
| *B60K 35/22* | (2024.01) |
| *B60K 35/53* | (2024.01) |
| *B60K 35/81* | (2024.01) |
| *G06F 1/16* | (2006.01) |
| *G06F 3/01* | (2006.01) |
| *G06F 3/041* | (2006.01) |
| *G06F 3/14* | (2006.01) |
| *G06F 3/16* | (2006.01) |
| *H05K 5/00* | (2025.01) |
| *H05K 5/30* | (2025.01) |

(52) U.S. Cl.
CPC .............. *B60K 35/10* (2024.01); *B60K 35/22* (2024.01); *B60K 35/53* (2024.01); *B60K 35/81* (2024.01); *B60K 2360/1438* (2024.01); *B60K 2360/146* (2024.01); *B60K 2360/148* (2024.01); *B60K 2360/21* (2024.01); *B60K 2360/55* (2024.01)

(58) Field of Classification Search
CPC ........ B60K 35/53; B60K 35/55; B60K 35/81; B60K 2360/145–1472; B60K 2360/1523; B60K 2360/18–182; B60R 11/0235; B60R 2011/0082; B60R 2011/0084; B60R 2011/0092; B60R 2011/0005
See application file for complete search history.

(56) References Cited

U.S. PATENT DOCUMENTS

| | | | | |
|---|---|---|---|---|
| 10,007,475 | B2* | 6/2018 | Jeon ................... G06F 3/04817 |
| 10,185,485 | B2* | 1/2019 | Kuhn ................... G06F 3/04883 |
| 10,606,362 | B2* | 3/2020 | Chung .................. G06F 3/017 |
| 10,678,428 | B2* | 6/2020 | Kim ..................... G06F 3/0487 |
| 11,043,191 | B1* | 6/2021 | Kang .................... G09G 5/10 |
| 11,057,514 | B1* | 7/2021 | Noh ..................... G06F 1/1643 |
| 11,106,358 | B2* | 8/2021 | Yoon .................... G06F 1/1694 |
| 11,355,091 | B2* | 6/2022 | Lee ..................... G09G 5/38 |
| 11,360,598 | B2* | 6/2022 | Park .................... G06F 3/04817 |
| 11,416,037 | B2* | 8/2022 | Choi .................... G06F 1/1615 |
| 11,507,250 | B2* | 11/2022 | Kim ..................... G06F 1/1681 |
| 11,885,761 | B2* | 1/2024 | An ...................... G01N 27/20 |
| 11,912,128 | B2* | 2/2024 | Shim .................... B60K 35/60 |
| 11,995,305 | B2* | 5/2024 | Chun ................... G06F 1/3265 |
| 12,004,312 | B2* | 6/2024 | Yoo ..................... H05K 5/0217 |
| 12,032,815 | B2* | 7/2024 | Cheon .................. G06F 3/0488 |
| 12,099,718 | B2* | 9/2024 | Wang ................... G06F 1/1677 |
| 2009/0027332 | A1* | 1/2009 | Cieler ................. G01C 21/3688 |
| | | | | 345/1.1 |
| 2009/0051830 | A1* | 2/2009 | Matsushita ........... G06F 3/1423 |
| | | | | 361/679.05 |
| 2017/0168769 | A1* | 6/2017 | Jeon ..................... G06F 1/1652 |
| 2018/0039410 | A1* | 2/2018 | Kim ..................... G06F 1/1652 |
| 2018/0348881 | A1* | 12/2018 | Chung .................. H04W 88/02 |
| 2020/0225848 | A1* | 7/2020 | Yoon ..................... G06F 3/041 |
| 2021/0149515 | A1* | 5/2021 | Park .................... G06F 1/1643 |
| 2021/0158783 | A1* | 5/2021 | Lee ..................... G09G 3/2003 |
| 2021/0206266 | A1* | 7/2021 | Shim .................... B60K 35/60 |
| 2021/0311526 | A1* | 10/2021 | Choi .................... G06F 1/1647 |
| 2022/0121346 | A1* | 4/2022 | Kim ..................... G06F 3/04817 |
| 2022/0351656 | A1* | 11/2022 | George Philip ....... G06F 1/1652 |
| 2022/0368784 | A1* | 11/2022 | Koh ..................... G06F 1/16 |
| 2023/0131358 | A1* | 4/2023 | Yoo ..................... G06F 1/1652 |
| | | | | 361/807 |
| 2023/0176720 | A1* | 6/2023 | Cheon .................. G06F 1/1624 |
| | | | | 345/173 |
| 2023/0188639 | A1* | 6/2023 | Kim ..................... H04M 1/0237 |
| | | | | 455/566 |
| 2023/0228588 | A1* | 7/2023 | Lee ..................... B60K 35/10 |
| | | | | 701/455 |
| 2023/0259268 | A1* | 8/2023 | Chun ................... G06F 3/0481 |
| | | | | 715/781 |
| 2023/0273645 | A1* | 8/2023 | Kwon .................. H04M 1/72454 |
| | | | | 361/679.01 |
| 2023/0289047 | A1* | 9/2023 | Choi .................... H04M 1/0235 |
| 2023/0384929 | A1* | 11/2023 | Wang ................... G06F 1/1624 |
| 2024/0054708 | A1* | 2/2024 | Zhang .................. G06F 1/1677 |
| 2024/0077962 | A1* | 3/2024 | Zhang .................. G06F 1/1624 |
| 2024/0241546 | A1* | 7/2024 | Hsieh ................... G06F 1/1654 |
| 2024/0242648 | A1* | 7/2024 | Kim ..................... G06F 3/04883 |
| 2024/0319858 | A1* | 9/2024 | Cheon .................. G06F 1/1643 |
| 2024/0329687 | A1* | 10/2024 | Dutta Choudhury ........ H04M 1/72454 |
| 2024/0365487 | A1* | 10/2024 | Helot ................... B60K 35/29 |
| 2024/0385436 | A1* | 11/2024 | Dehkordi .............. G06F 3/012 |
| 2024/0411445 | A1* | 12/2024 | Kang ................... G06F 1/1624 |

FOREIGN PATENT DOCUMENTS

| | | |
|---|---|---|
| DE | 10 2014 006 338 A1 | 4/2014 |
| DE | 10 2013 000 071 A1 | 7/2014 |
| DE | 10 2014 016 326 A1 | 5/2016 |
| DE | 20 2018 101 490 U1 | 7/2018 |
| DE | 10 2018 208 250 B3 | 9/2019 |
| DE | 10 2021 120849.1 | 8/2021 |
| EP | 1 450 503 A2 | 8/2004 |
| EP | 3 659 847 A1 | 6/2020 |
| FR | 2 971 878 | 8/2012 |
| WO | WO 2013/104376 A1 | 7/2013 |
| WO | WO 2013/104377 A1 | 7/2013 |
| WO | PCT/EP2022/072020 | 8/2022 |

OTHER PUBLICATIONS

International Search Report issued in International Application No. PCT/EP2022/072020 dated Dec. 8, 2022.
Written Opinion issued in International Application No. PCT/EP2022/072020 dated Dec. 8, 2022.
German Office Action issued in German Application No. 10 2021 120 849.1 dated Mar. 31, 2022.

* cited by examiner

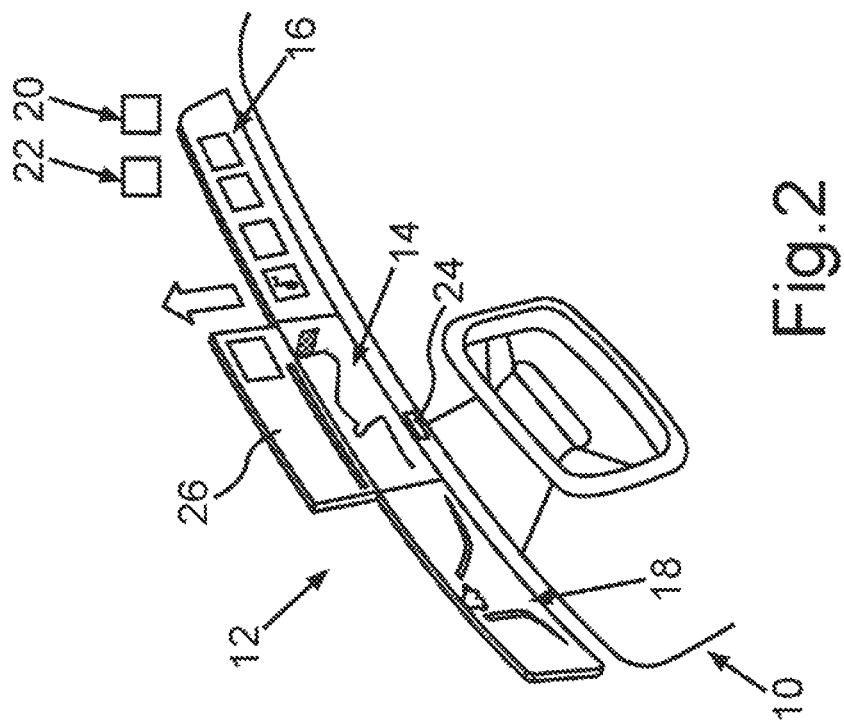
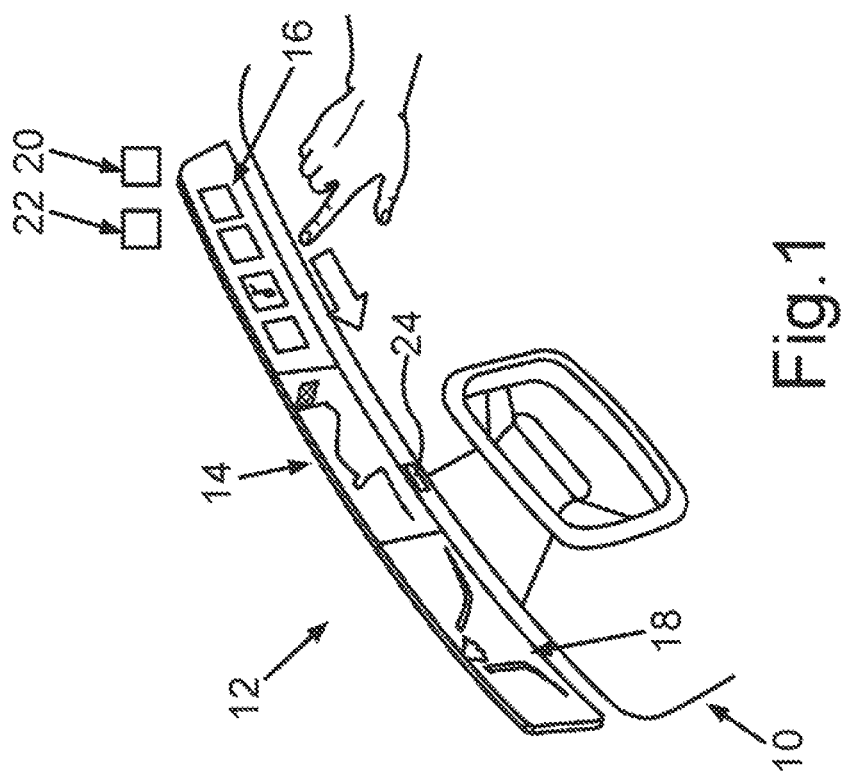

DISPLAY DEVICE FOR A MOTOR VEHICLE, METHOD FOR DISPLAYING DISPLAY CONTENT ON AN EXTENDABLE SCREEN AND MOTOR VEHICLE HAVING A DISPLAY DEVICE

CROSS-REFERENCE TO RELATED APPLICATIONS

This application is a U.S. national stage of International Application No. PCT/EP2022/072020, filed on Aug. 4, 2022, which claims the priority benefit of German Patent Application No. 10 2021 120 849.1 filed on Aug. 11, 2021. Both the International Application and the German Patent Application are incorporated by reference herein in their entirety.

BACKGROUND

1. Field

The examples of an invention may relate to a display device for a motor vehicle, comprising at least one first and one second screen, which are configured to present respective display contents. The examples may further relate to a method for displaying display content on an extendable screen, and to a motor vehicle having a display device.

2. Description of the Related Art

Motor vehicles having display devices comprising a plurality of screens are known. For example, center displays and front passenger displays are often installed in motor vehicles, with display contents being able to be moved from one display onto the other. The disadvantage of previously known display devices is that, after the display contents are moved to, for example, the center display, original display contents of the center display are covered or reduced in size, the center display meaning a screen in the center console of the motor vehicle.

DE 10 2014 016 326 A1 discloses a method for actuating a motor vehicle infotainment system of the type in question, in which at least one data set stored on at least one mobile terminal is transmitted wirelessly to the infotainment system and received by the infotainment system, as soon as a swiping gesture carried out on the mobile terminal has been detected, wherein the at least one data set is initially stored in a buffer of the infotainment system and then transmitted exclusively to a further infotainment system and subsequently processed by means of the infotainment system when a predefined confirmation action has been detected at the vehicle.

WO 2013/104377 A1 discloses a method for presenting at least one display content on at least one display unit in a motor vehicle, wherein, taking into account a position of a user in the motor vehicle, the at least one display content is specifically presented for this user on the at least one display unit.

DE 10 2018 208 250 B3 discloses a display device for a motor vehicle, having a first display element, a second display element and a folding element, which is arranged between the first display element and the second display element and which connects the two display elements to each other, wherein the folding element is arranged between two side edges of the two display elements, and therefore the two display elements are adjustable at an angle to each other.

SUMMARY

According to an aspect of the example, splitting or moving of display contents between the screens in a display device may be improved.

The examples may be subject matter of the independent patent claims. Advantageous developments of the examples mby disclosed in the dependent claims, the description below and the figures.

In an example, after display content is moved from a front passenger display to a center display, an extendable screen may extend out from the center display such that the original content of the center display can be presented unchanged and the moved display content is displayed on the newly created display surface of the extendable screen.

In an example, a display device for a motor vehicle, may comprise at least a first screen and a second screen, which are configured to present respective display contents. For example, the first screen may be a center display of the motor vehicle and the second screen may be a front passenger display or a display of a combination instrument of the motor vehicle. For example, the screens may be in the form of LEDs, LCDs and/or OLEDs. Alternatively, the first screen may also be the front passenger display and the second screen may be the center display. For example, display contents may be applications that can be presented in display windows, the display contents being able to include, for example, entertainment contents, especially images, movies and music information, navigation maps and safety-relevant contents.

In an example, an extendable screen may be arranged in a housing of the display device, said extendable screen being able to be shifted by an adjustment device between an extended position, in which the extendable screen is extended out of the housing, and a retracted position, in which the extendable screen is substantially recessed in the housing, wherein the display device furthermore comprises a control unit, which is configured to activate the adjustment device for shifting the extendable screen into the extended position, and to display the display content on the extendable screen, when a user action for moving display content from the second screen onto the first screen is detected.

In other words, in addition to the first and the second screen, an extendable screen may be provided which, in a retracted position, is substantially recessed in a housing of the display device, in particular in a housing of the first screen. Substantially means that at least half of the extendable screen is recessed in the housing. This enables the screen to still protrude from the housing and to be operable, but only that part of the screen which is extended can be used. In an example, the extendable screen is fully recessed in the housing. If display content is now moved by a user action from the second screen to the first screen, this can be determined by a control unit, which activates an adjustment device for extending out the extendable screen into an extended position. The control unit may be a processor, in particular a microprocessor, of the display device, which monitors inputs to the display device, in particular to the first and/or second screen, and, when movement of the display content is detected, can transmit a control signal to the adjustment device for extending out the extendable screen into the extended position.

The adjustment device may comprise, for example, one or more electric motors, which extend the extendable screen out of the housing into the extended position. The user action for moving the display content may include, for example, a touch action on one of the screens and/or an operator control element, a gesture, an eye tracking algorithm and/or an input into a mobile terminal. After extension of the extendable screen into the extended position, the moved display content can finally be displayed on the extendable screen, with display content on the first screen, for example, not being changed. In an example, the first screen and the extendable screen in the extended position form an enlarged screen on which a plurality of display contents, in particular display content already displayed on the first screen and the display content moved from the second screen can be presented.

The advantage of the examples may be that the original content of the first screen is not reduced in size or superimposed by the moved display content. Furthermore, a driver of the motor vehicle can see more clearly what a front passenger has moved onto the first screen. A driver is therefore not distracted from driving tasks, and any driving-relevant display contents on the first screen continue to remain clearly visible. Overall, movement of display contents between the screens can thus be improved.

The examples may also afford additional advantages.

In an example, the control unit is configured, when the user action is detected, to determine a size of the moved display content and to activate the adjustment device for adjusting the extendable screen into an extension height dependent on the determined size of the display content. In other words, an extension height to which the extendable screen is extended in the extended position may be variable. The distance to which the extendable screen extends out of the housing when the user action for moving the display content is detected may depend on the size of the display content. The size means the dimensions of the display content that the display content has on the second screen. The size of the display content can be determined by the control device, in particular on the basis of the digital dimensions of the display content on the second screen. In an example, the size or dimensions of the display content is not changed during the move to the first screen or to the extendable screen, and the adjustment device moves the extendable screen to the appropriate extension height in accordance with the size of the display content. In particular, the extension height can correspond precisely to the height and/or width of the display content. For example, in the case of display content that occupies the entire second screen, such as a navigation map, the extendable screen can be fully extended, and in the case of display content that occupies only part of the second screen, for example display of a music title that occupies only a few lines of the second screen, the extendable screen can be extended only by this part or these lines. This embodiment affords the advantage that the extendable screen is not always extended by the entire extension height, which could distract a driver of the motor vehicle, but always appropriately to what is currently required.

In an example, the extendable screen and the first screen may be formed integrally with a contiguous display surface, wherein the contiguous display surface is formed from a display area of the first screen, which is visible both in the retracted position and in the extended position, and a display area of the extendable screen, which is visible in the extended position and is recessed in the retracted position in the housing. In other words, the extendable screen and the first screen may be formed as a contiguous screen, wherein, in the retracted position, only part of the extendable screen is recessed in the housing and part of the first screen is visible. In the extended position, it is then possible, by extending part of the extendable screen, for an enlarged area to be made available that uses the screen surfaces of the first screen and of the extendable screen. The contiguous screen or the integral configuration means that the first screen and the extendable screen can have an identical pixel matrix and the screens define display areas or parts of the contiguous screen, which can be or are not recessed in the housing. In an example, the contiguous screen may be designed as a flexible screen, which is at least partially bendable or foldable, as a result of which the part of the extendable screen requires less space for accommodating it in the housing. For example, the screens may be made available as an OLED screen. The advantage afforded by this example may be that a space-saving arrangement of the extendable screen can be achieved.

In an example, the control unit may be configured to present display content, which is displayed on the first screen, unchanged at an original display position after extension of the extendable screen. The moved display content is displayed on the extended part of the extendable screen, and therefore an original display content on the first screen is not changed and remains in the same position as it was originally displayed. This affords the advantage that vehicle occupants, in particular a driver, are/is less distracted by a movement of display content, since the original display content remains in the same position and thus better operator control can be made available.

In an example, the screens may be configured as touch-sensitive screens and/or wherein an operator control element is provided, which is designed to control the display device, in particular wirelessly. In other words, the screens can be controlled by touch, especially the first, the second and the extendable screen. In an example, the user action for moving the display content can involve touching and drawing the display content to that edge of the second screen which is nearest to the first screen or is adjacent thereto. Alternatively or in addition, an operator control element may be provided, which can be designed, for example, as a remote control or as a mobile terminal, wherein movement of the display contents and adjustment of the display device between the extended position and the retracted position is made possible by the operator control element. This may afford the advantage that a particularly intuitive control of the display device can be provided.

In an example, the display device has a camera device, which is designed to carry out gesture detection, wherein the user action for moving the display content is a predefined gesture detected by the camera device and/or wherein the display device has a microphone device, which is designed to carry out voice control of the display device, wherein the user action for moving the display content is a predefined voice command detected by the microphone device. This enables the camera device to move the display content onto the extendable screen without touching one of the screens. For example, the predefined gesture that can be used to move the display content may be swiping toward the first screen. In an example, the camera device can cover an entire vehicle interior such that even passengers who are seated on a rear seat of the motor vehicle can control the display device. Alternatively or additionally, a microphone device may be provided, which can receive and interpret voice commands for voice control of the display device, wherein the control of the display device, in particular the moving of the display content, can be carried out by one or more predefined voice commands. Another example for controlling the display device can thereby be provided.

In an example, the display device has a third screen, which is configured for presenting display contents, wherein the control unit is furthermore configured to activate the adjustment device for shifting the extendable screen into the extended position, and to display the display content of the third screen on the extendable screen, when the user action for moving the display content from the third screen onto the first screen is detected. In other words, a third screen can also be provided, via which display contents can be moved onto the extendable screen. For example, the third screen may be a display of a combination instrument or a rear seat display. In an example, the display device may also have further screens, which are configured to move display content onto the extendable screen. In an example, at least the first and the second screen are formed adjacent to each other. This means that said screens can have an identical pixel matrix, with, for example, all three screens being formed adjacent, and therefore a contiguous display surface for all three screens can be achieved.

In an example, the control unit is configured to activate the adjustment device for shifting the extendable screen into the retracted position, and to display the display content on the second or third screen, when a further user action for moving the display content back from the extendable screen, which is in the extended position, onto the second or third screen is detected. This means that the display content can be displayed on the extendable screen, which is in the extended position, and said display content can be moved onto one of the screens by a user action for moving the display content back. This allows the display content to be removed from the extendable screen, and the extendable screen can be moved into the retracted position. For example, the display content can be moved back onto the second screen or displayed on the third screen. Alternatively, the display content can also be moved by a user action onto the first display screen, i.e. the center display, in order to be displayed there. The advantage that may be afforded by this example is that display content can be moved between a plurality of screens, which enables a flexible display of display contents.

In an example, the extended position is formed in multiple steps, wherein the control unit is configured to activate the adjustment device for extension of a further step for respective further display content to be displayed on the extendable screen. In an example, display contents originating from the second screen can therefore be displayed at one step and display contents originating from the third screen can be displayed at another step. The multi-step design means that the extendable screen can be extended out further by a predefined path length for each step. This allows a display surface to increase with each additional step. In an example, at least two steps can be provided, by which the extendable screen can extend out. By this example, a particular configuration of the display device can be achieved.

In an example, the display of the display content on the extendable screen in the extended position may be provided when a payment criterion is present. In other words, the function of the extendable screen may be a "function on demand", which can be unlocked for payment. This function can be added, with it being possible, for example, for the control unit to check whether the payment criterion is present. For example, data can be retrieved from the Internet and can be used to create a release on the basis of the payment criterion which is present. In an example, some functions of the display device can be provided free of charge and others only for payment. For example, increasing the display surface by extending the extendable screen can be provided for free, wherein, for example, the subsequent automatic arrangement of the moved display content on the newly created display surface of the extendable screen is then carried out only when the payment criterion is present.

In an example, a method for displaying a display content on an extendable screen with a display device may be provided, wherein the display device has at least a first screen and a second screen, and wherein an extendable screen may be arranged in a retracted position in a housing of the display device, wherein a control unit checks whether display content from the second screen is moved onto the first screen and, if this is the case, an adjustment device is activated, which shifts the extendable screen from the retracted position into an extended position, in which the extendable screen is extended out of the housing, with the display content being displayed on the extendable screen. The same advantages and variation possibilities as in the case of the display device arise.

As aspect of the examples may include a motor vehicle having a display device according to the described examples. In an example, a motor vehicle may be in the form of a motorized vehicle, in particular as a passenger car or truck, or as a minibus or motorcycle.

An aspect of the examples may include the control device for the motor vehicle. The control device may comprise a data processing device or a processor device configured to carry out a method according to the described examples. For this purpose, the processor device may comprise at least one microprocessor and/or at least one microcontroller and/or at least one FPGA (field programmable gate array) and/or at least one DSP (digital signal processor). Furthermore, the processor device may comprise program code configured to carry out the method according to the described examples upon execution by the processor device. The program code may be stored in a data memory of the processor device.

An aspect of the examples may include developments of the method according to the described examples, which have features as have already been described in connection with the developments of the display device according to the described examples. For this reason, the corresponding developments of the method according to the described examples will not be described again here.

The examples also comprise the combinations of the features of the described examples. The examples thus also comprise implementations, each having a combination of the features of a plurality of the examples described, provided that the examples were not described as mutually exclusive.

BRIEF DESCRIPTION OF DRAWINGS

Examples of the invention will be described below. In this regard:

FIG. 1 shows a motor vehicle with a display device according to an example;

FIG. 2 shows the motor vehicle with the display device and an extendable screen in an extended position.

DESCRIPTION

The examples discussed below are examples of the invention. In the examples, the described components each may represent individual features that should be considered independently of one another and also develop the examples in each case independently of one another. The disclosure is therefore also intended to comprise combinations of the features of the examples other than those illustrated. Furthermore, the described examples may also be supplemented by further features of the examples that have already been described.

In the figures, identical reference signs each denote elements of identical function.

FIG. 1 shows a schematically illustrated motor vehicle 10 with a display device 12 according to an example. The display device 12 comprises a first screen 14, which may be, for example, a center display in a center console of the motor vehicle 10, and a second screen 16, which may be, for example, a front passenger display. In addition, the display device 12 may also have a third screen 18, which may be, for example, a display of a combination instrument.

The screens 14, 16, 18 may be arranged adjacent to each other on a dashboard of the motor vehicle 10. In the situation shown, for example, a navigation display can be presented on the center display 14 and a music application on the front passenger display as display content, which is to be moved from the front passenger display 16 onto the center display 14 for display.

For moving the display content, the screens 14, 16, 18 can be configured as touch-sensitive screens, with the display content being able to be carried out by touching and drawing of the display content to that edge of the front passenger display 16, which is closest to the center display 14. Alternatively or additionally, the display device 12 may have a camera device 20, which is designed to detect gestures and to carry out the movement of the display content onto the center display 14 by a predefined gesture. Alternatively or additionally, an operator control element (not shown) may be provided, such as a rotary knob, touchpad or cursor keys, by which the display device 12 can be controlled. Furthermore, a microphone device (not shown) may be provided, which is designed to control the display device 12 via a voice control. For example, a predefined voice command may be provided for this purpose, such as: "push music into the center display".

The movement of the display content from the front passenger display 16 onto the center display 14 is detected by a control unit 22 of the display device 12, wherein the control unit 22 can be, for example, a processor, in particular a microprocessor, of the display device 12. The control unit 22 can determine, for example, a touch action on the touch-sensitive front passenger display 16 and thus the movement shown to the center display 14.

So that the navigation display in the center display 14 is not superimposed by the music application or the presented navigation display is not reduced in size, provision is made that the control unit 22 activates an adjustment device 24, which is designed to extend an extendable screen (not shown in this figure), which is located in a retracted position in a housing of the display device 12, for example, in a housing of the center display 14, out of the housing into an extended position such that a display surface of the extendable screen 26 becomes visible.

The adjustment device 24 may, for example, have actuators, in particular electric motors, and guide elements, by which the extendable screen can be shifted into the extended position, wherein the display device 12 is shown with the extendable screen 26 in the extended position according to an example in FIG. 2.

In FIG. 2, the user action for moving the display content from the front passenger display 16 onto the center display 14 has already been detected by the control unit 22, and the adjustment device 24 has been activated by the control unit 22 to bring the extendable screen 26 into the extended position. Here, the extendable screen 26 may be extended out of the housing, in particular may be extended upward, such that an additional display surface is produced. In an example, the first screen 14 and the extendable screen 26 may be formed integrally, and therefore a contiguous display surface is produced, wherein, in the extended position, the entire contiguous display surface may be visible. In the retracted position, as previously described, only the display surface of the extendable screen 26 can be recessed in the housing, with the display surface of the first screen 14 continuing to be visible.

The moved display content, that is, the music application, can then be displayed on the additionally generated display surface of the extendable screen 26, which for example may be a flexible screen. Thus, the navigation display of the center display is not superimposed or reduced in size, and a driver can, for example, more quickly recognize which content the front passenger has moved onto the center display 14 or the extendable screen 26.

In the same manner, for example, the driver can also bring for display a display content onto the center display 14, in particular the extendable screen 26, from the display of the combination instrument 18. For example, the extendable screen 26 can be brought into multi-step extended positions, in particular two extended positions, such that, for example, if display content has already been moved from the front passenger display 16 for display on the extendable screen 26, and the driver wants to present further display content on the extendable screen 26 from the display of the combination instrument 18, the extendable screen 26 can be extended by a further step such that an enlarged display surface is created and then the display content of the display of the combination instrument 18 is presented on the additionally created display surface.

To remove the display content from the extendable screen 26, for example, another user action for pushing back the display content by the control unit 22 can be detected, wherein, depending on the pushing back direction, the display content can be pushed onto the front passenger display 16 or the display of the combination instrument 18. If this has been detected by the control unit 22, the latter can activate the adjustment device 24, which shifts the extendable screen 26 back into the retracted position or retracts it by one step.

In an example, the previously described provision of the extendable screen 26 can be provided by shifting from the retracted position into the extended position or back only when a payment criterion is present. This means that the extendable screen 26 can be "display on demand", which is provided only if this function has been previously enabled by payment.

All in all, the examples show how an extendable screen 26 can be provided by the invention by sliding display content from the front passenger display 16 or the display of the combination instrument 18 onto the center display 14.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide v. DIRECTV*, 358 F3d 870, 69 USPQ2d 1865 (Fed. Cir. 2004).

The invention claimed is:

1. A display device for a motor vehicle, comprising:
at least a first screen and a second screen, configured to present at least one display content;
an extendable screen arranged in a housing of the display device, the extendable screen shiftable by an adjustment device between an extended position, in which the extendable screen is extended out of the housing, and a retracted position, in which the extendable screen is substantially recessed in the housing; and
a control unit configured to activate the adjustment device to shift the extendable screen into the extended position, and to display a first display content of the at least one display content on the extendable screen, when a user action to move the first display content from the second screen onto the first screen is detected,
wherein,
the control unit is configured, when the user action is detected, to determine a size of the first display content moved and to activate the adjustment device to adjust the extendable screen into an extension height dependent on a determined size of the first display content,
the extendable screen and the first screen are formed integrally with a contiguous display surface,
the control unit is configured to present a second display content of the at least one display content, which is displayed on the first screen, unchanged at an original display position after extension of the extendable screen.

2. The display device according to claim 1,
wherein the contiguous display surface is formed from a display area of the first screen, which is visible both in the retracted position and in the extended position, and a display area of the extendable screen, which is visible in the extended position and is recessed in the retracted position in the housing.

3. The display device according to claim 1, wherein the first screen, the second screen and a third screen are configured as touch-sensitive screens and/or wherein an operator control element is provided, which is configured to control the display device, including to wirelessly control the display device.

4. The display device according to claim 1,
wherein the display device has a camera device, which is configured to carry out gesture detection, and the user action for moving the first display content is a gesture detected by the camera device and/or
wherein the display device has a microphone device, which is configured to carry out voice control of the display device, and the user action for moving the first display content is a voice command detected by the microphone device.

5. The display device according to claim 1,
wherein the display device has a third screen, which is configured for presenting a display content,
wherein the control unit is configured to activate the adjustment device to shift the extendable screen into the extended position, and to display the display content of the third screen on the extendable screen, when the user action to move the display content from the third screen onto the first screen is detected.

6. The display device according to claim 5,
wherein the control unit is configured to activate the adjustment device to shift the extendable screen into the retracted position, and to display the display content on the second screen or the third screen, when a further user action to move the display content back from the extendable screen, which is in the extended position, onto the second screen or third screen is detected.

7. The display device according to claim 1,
wherein the extended position is formed in multiple steps, wherein the control unit is configured to activate the adjustment device (24) for extension of a further step for a respective further display content to be displayed on the extendable screen.

8. The display device according to claim 1, wherein displaying of the first display content on the extendable screen in the extended position is provided when a payment criterion is present.

9. A method of displaying at least one display content, comprising:
displaying at least one display content on a display device, which has at least a first screen, a second screen, and an extendable screen, wherein the extendable screen and the first screen are formed integrally with a contiguous display surface;
checking, by a controller, whether a movement, by a user action, of a first display content of the at least one display content from the second screen onto the first screen is detected and, in response to the movement, activating an adjustment device to shift the extendable screen from a retracted position into an extended position, in which the extendable screen is extended out of a housing, with the first display content being displayed on the extendable screen;
determining, by the controller, a size of the first display content moved and to activate the adjustment device to adjust the extendable screen into an extension height dependent on a determined size of the first display content when the user action is detected; and
presenting a second display content of the at least one display content, which is displayed on the first screen, unchanged at an original display position after extension of the extendable screen.

10. A motor vehicle, comprising:
a display device including,
at least a first screen and a second screen, configured display at least one display content;
an extendable screen arranged in a housing of the display device, the extendable screen and the first screen formed integrally with a contiguous display surface, the extendable screen shiftable by an adjustment device between an extended position, in which the extendable screen is extended out of the housing, and a retracted position, in which the extendable screen is substantially recessed in the housing; and
a control unit configured to:
activate the adjustment device to shift the extendable screen into the extended position,
display a first display content of the at least one display content on the extendable screen, when a user action to move the first display content from the second screen onto the first screen is detected,
when the user action is detected, determine a size of the first display content moved and to activate the adjustment device to adjust the extendable screen into an extension height dependent on a determined size of the first display content,
present a second display content of the at least one display content, which is displayed on the first screen, unchanged at an original display position after extension of the extendable screen.

11. The motor vehicle according to claim 10,
wherein the contiguous display surface is formed from a display area of the first screen, which is visible both in the retracted position and in the extended position, and a display area of the extendable screen, which is visible in the extended position and is recessed in the retracted position in the housing.

12. The motor vehicle according to claim 10, wherein the first screen, the second screen and a third screen are configured as touch-sensitive screens and/or wherein an operator control element is provided, which is configured to control the display device, including to wirelessly control the display device.

13. The motor vehicle according to claim 10,
wherein the display device has a camera device, which is configured to carry out gesture detection, and the user action for moving the first display content is a gesture detected by the camera device and/or
wherein the display device has a microphone device, which is configured to carry out voice control of the display device, and the user action for moving the first display content is a voice command detected by the microphone device.

14. The motor vehicle according to claim 10,
wherein the display device has a third screen, which is configured for presenting a display content,
wherein the control unit is configured to activate the adjustment device to shift the extendable screen into the extended position, and to display the display content of the third screen on the extendable screen, when the user action to move the display content from the third screen onto the first screen is detected.

15. The motor vehicle according to claim 14,
wherein the control unit is configured to activate the adjustment device to shift the extendable screen into the retracted position, and to display the display content on the second screen or the third screen, when a further user action to move the display content back from the extendable screen, which is in the extended position, onto the second screen or third screen is detected.

16. The motor vehicle according to claim 10,
wherein the extended position is formed in multiple steps, wherein the control unit is configured to activate the adjustment device for extension of a further step for a respective further display content to be displayed on the extendable screen.

17. The motor vehicle according to claim 10, wherein displaying a display content, from among the at least one display content, on the extendable screen in the extended position is provided when a payment criterion is present.

* * * * *

UNITED STATES PATENT AND TRADEMARK OFFICE
CERTIFICATE OF CORRECTION

| | | |
|---|---|---|
| PATENT NO. | : 12,360,564 B2 | Page 1 of 1 |
| APPLICATION NO. | : 18/682653 | |
| DATED | : July 15, 2025 | |
| INVENTOR(S) | : Jacques Helot et al. | |

It is certified that error appears in the above-identified patent and that said Letters Patent is hereby corrected as shown below:

On the Title Page

Item (54), and in the Specification, Column 1, Lines 1-5, delete "DISPLAY DEVICE FOR A MOTOR VEHICLE METHOD FOR DISPLAYING DISPLAY CONTENT ON AN EXTENDABLE SCREEN AND MOTOR VEHICLE HAVING A DISPLAY DEVICE" and insert --DISPLAY DEVICE FOR A MOTOR VEHICLE, METHOD FOR DISPLAYING DISPLAY CONTENT ON AN EXTENDABLE SCREEN AND A MOTOR VEHICLE HAVING A DISPLAY DEVICE--.

In the Claims

Column 10, Line 2, In Claim 7, after "device" delete "(24)".

Signed and Sealed this
Fourth Day of November, 2025

John A. Squires
*Director of the United States Patent and Trademark Office*